(12) United States Patent
Switkes et al.

(10) Patent No.: US 8,985,652 B1
(45) Date of Patent: Mar. 24, 2015

(54) SYSTEM FOR PEDESTRIAN LEG PROTECTION IN VEHICLE IMPACT

(71) Applicant: Google Inc., Mountain View, CA (US)

(72) Inventors: Jonathan Switkes, San Jose, CA (US);
Alex Khaykin, San Francisco, CA (US);
Daniel Lynn Larner, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/037,054

(22) Filed: Sep. 25, 2013

(51) Int. Cl.
*B60R 19/30* (2006.01)
*B60R 19/20* (2006.01)
*B60R 19/03* (2006.01)

(52) U.S. Cl.
CPC ............. *B60R 19/20* (2013.01); *B60R 19/03* (2013.01)
USPC ............................................. 293/136

(58) Field of Classification Search
CPC ..................................... B60R 19/18; B60R 19/20
USPC ......... 293/107, 110, 109, 132, 133, 135, 136; 267/140
See application file for complete search history.

(56) References Cited

U.S. PATENT DOCUMENTS

| | | | | |
|---|---|---|---|---|
| 3,702,711 A | * | 11/1972 | Beckley | 296/181.2 |
| 3,802,727 A | * | 4/1974 | Beckley | 293/120 |
| 4,863,997 A | * | 9/1989 | Shibuya et al. | 525/92 D |
| 5,090,053 A | * | 2/1992 | Hayes | 2/2.5 |
| 6,467,822 B1 | | 10/2002 | Leng | |
| 7,004,532 B2 | | 2/2006 | Cartella | |
| 8,276,953 B2 | | 10/2012 | Erzgraber et al. | |
| 2003/0020289 A1 | | 1/2003 | Dohrmann et al. | |
| 2012/0161473 A1 | | 6/2012 | Schaefer | |

FOREIGN PATENT DOCUMENTS

WO 2004/108477 12/2004

* cited by examiner

*Primary Examiner* — Lori L Lyjak
(74) *Attorney, Agent, or Firm* — McDonnell Boehnen Hulbert & Berghoff LLP.

(57) ABSTRACT

A system for protecting a pedestrian during impact with a vehicle, the system having a bumper adapted for attachment to an end of the vehicle, wherein the bumper is comprised of a plurality of air sacs, wherein the bumper has a horizontal thickness extends from the end of the vehicle, wherein at least some of the plurality of air sacs stretch and then burst during impact between the bumper and a pedestrian causing deceleration along the horizontal width of the bumper during the impact, wherein the bumper undergoes plastic deformation during impact with the pedestrian as the at least some of the air sacs burst during impact, and wherein the bursting of some of the plurality of air sacs reduces spring back of the bumper on the pedestrian.

27 Claims, 9 Drawing Sheets

SYSTEM FOR PEDESTRIAN LEG PROTECTION IN VEHICLE IMPACT

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Motorized vehicles have been used for over 100 years to transport people and products from one location to another location. On occasion, an accident will occur, for a variety of reasons, where a vehicle will collide with another vehicle or object, or even a person. The collision may cause damage to the driven vehicle or the vehicle or object collided with, and may also cause injury to the occupants of the vehicle or the person collided with. As noted above, some vehicles have been equipped with autopilot systems, which permits the vehicle operator to switch from a manual mode to an autonomous mode or to modes that lie somewhere in between that may serve to prevent and/or reduce vehicle collisions.

As a result of the vehicle accidents that occasionally occur, in addition to the autopilot systems, certain protective features have been installed into vehicles. For example, automobiles have been structurally designed to meet certain crashworthiness standards to protect the occupants of a vehicle involved in a collision. In addition, bumpers have been installed on the front and rear of an automobile to prevent injury to the automobile in the event of a low speed collision. Vehicle bumpers are generally designed to absorb energy to prevent injury to the vehicle itself during a collision.

As noted above, vehicle bumpers may serve to protect the vehicle in a collision. However, they are generally much too hard to provide cushioning to a pedestrian involved in a collision with a vehicle. For example, vehicle bumpers are commonly made from open or closed cell foam, or from molded plastic or formed metal. These structures are generally too stiff and strong to provide cushioning to a pedestrian in the event of a pedestrian collision. Thus, a pedestrian may suffer bodily injury upon impact with a vehicle bumper during a collision with a vehicle.

Moreover, vehicle bumpers typically "spring back" after impact. Therefore, the spring back of the vehicle bumper may cause a pedestrian to rebound off the vehicle and incur a secondary impact with the road surface or other object. Vehicle bumpers are primarily designed to protect the vehicle, but are not designed to avoid pedestrian spring back which may cause secondary injuries to a pedestrian as a result. Thus, with current conventional bumper designs, a pedestrian may suffer an initial injury upon initial impact with the vehicle bumper during a collision, and also suffer a secondary injury after impacting the roadway or other object after rebounding from the vehicle bumper as a result of the "spring back" of the bumper.

SUMMARY

The present application discloses embodiments that relate to a system for protecting a pedestrian during impact with a vehicle. In one aspect, the system may have a bumper adapted for attachment to an end of the vehicle, wherein the bumper is comprised of a plurality of air sacs, wherein the bumper has a horizontal thickness extending from the end of the vehicle, wherein at least some of the plurality of air sacs stretch and then burst during impact between the bumper and a pedestrian causing deceleration along the horizontal width of the bumper during the impact, wherein the bumper undergoes plastic deformation during impact with the pedestrian and at least some of the air sacs burst during impact, and wherein the bursting of some of the plurality of air sacs reduces spring back of the bumper on the pedestrian.

In another aspect, the system may have a bumper adapted for attachment to an end of the vehicle, wherein the bumper is comprised of a visco-elastic material, wherein the bumper has a horizontal thickness that extends from the end of the vehicle, wherein the visco-elastic material undergoes deformation and causes deceleration along the horizontal thickness of the bumper during impact between the pedestrian and the bumper, and wherein the visco-elastic material does not immediately return to an original shape after impact thereby reducing spring back of the bumper on the pedestrian.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In view of the initial and secondary injuries that a pedestrian may suffer when impacting a vehicle bumper during a collision with a vehicle, there is a need to provide a vehicle bumper that eliminates or reduces injury to a pedestrian upon initial impact with the vehicle bumper. In addition, there is a need to provide a vehicle bumper that eliminates or reduces spring back from the bumper to prevent or reduce secondary injury to a pedestrian caused by impacting the roadway or other object after rebounding from the vehicle bumper.

Example embodiments may be directed to a vehicle bumper that provides energy absorption and cushioning in the event of a collision with a pedestrian. At least two different structures and materials are contemplated that provide energy absorption and cushioning in the case of pedestrian impact.

In one embodiment, the vehicle bumper is formed of an energy absorption structure composed of multiple air sacs. Air sacs could be small, medium, or large in size, for instance from 1 mm to 100 mm or larger in characteristic length. Air sacs may be made from a polymer or elastic material and filled with air or other suitable gas and/or liquid. The air cells or sacs could also be tubular with a length on the order of 3 to 4 inches, and several inches in diameter (however, the length should not be considered limiting, and other lengths are possible).

The respective air sacs or cells may be bonded to one another using adhesive, or heat sealed together. Alternately, the air sacs or cells may be held in place within a bag or net. In a pedestrian impact, energy is absorbed by the (a) stretching and then (b) popping of each air sac. Furthermore, as a result of the popping of the air sacs, the bumper is largely destroyed in a pedestrian collision. Thus, there may be less spring back after air is released from the fractured sacs. As a result, this design eliminates or reduces spring back that may cause the pedestrian to suffer a secondary impact with the roadway or other object.

A solid structure may be created by compressing the sacs in a mold when they are bonded to one another, in a similar manner as a Styrofoam cup or cooler is formed. Or, a porous structure may be constructed from the sacs with gaps between adjacent sacs that touch at only isolated points. The porous structure may provide a lower effective modulus and strength for the bulk structure as compared to a structure where the air sacs are tightly compressed against one another.

In another embodiment, the bumper is formed of a visco-elastic material that absorbs impact energy. A low cross-linked silicone or acrylic is a good choice for this material. More or less cross-linking may be used as desired. However, the more cross-linking that is used, the more "spring back" the bumper material will have. When using a vehicle bumper comprised of a visco-elastic material, in a pedestrian impact the viscous material is forced to move out of the way of the pedestrian's legs and lower body. Relative speed between the vehicle and the pedestrian would be gradually slowed as the viscous losses in the material convert kinetic energy to heat.

The damping ratio and density are chosen to provide for gradual deceleration over a large distance, to prevent injury to the pedestrian during the initial impact with the vehicle bumper. Because the material is highly viscous, spring back is minimal and very well damped. This helps prevent the pedestrian from rebounding off the vehicle and incurring a dangerous secondary impact with the road surface or other object.

It will be appreciated that a bumper made of visco-elastic material, such as low cross-linked silicone, will be relatively heavy, and may also not be as "soft" as desired. Of course, unnecessary additional weight on a vehicle is undesirable. Therefore, it may be desirable to reduce the amount of material within the bumper.

To this end, a lattice structure or other relief features could be included in the visco-elastic material to reduce the amount of material, and thus the weight of the bumper; as well as the effective stiffness of the bumper. This allows the effective bulk modulus of the material to be reduced compared to a solid volume of the same material, providing a "softer" bumper.

Such a structure could be formed by combining sheets of silicone layers together. Each sheet could have material removed from the sheet via a die cut operation. For example, one inch diameter (or larger) holes or squares could be cut from the sheet to remove material. Alternately, it is also possible that the silicone sheets could be molded with holes or gaps to provide for less material.

In any event, the silicone sheets could be stacked together and adhered with a silicone adhesive or pressure sensitive adhesive. Some sheets could have relief cuts or holes, and others without relief cuts or holes, as desired.

Using either embodiment, the vehicle bumper may have a horizontal thickness of 1 to 2 feet, or more. In addition, the height of the vehicle bumper may also have a height of around 2 feet and extend from the ankle of a pedestrian to a point above the knee. Thus, the vehicle bumper could extend to a point closer to the ground than a conventional bumper.

In addition, the pedestrian bumper may be positioned over the conventional vehicle bumper, and would therefore extend outwardly 1 to 2 feet from the conventional bumper. By having a vehicle bumper of this substantial width and height, the forces on the pedestrian's leg are spread out by the depth of the bumper, as well as the height of the bumper.

Using either embodiment, it is possible to provide a bumper that has a relatively soft outermost bumper section for very low speed collisions, where the material becomes progressively less soft as it extends towards the vehicle, to provide greater cushioning as the speed of the collision increases.

In addition, the two embodiments could also be advantageously combined. For example, the outermost portion of the bumper could be comprised of air sacs, and an inner bumper section comprised of visco-elastic material (or vice versa), as desired. Alternately, layers of visco-elastic material could be interspersed between layers of air sacs, in either a horizontal or vertical direction, as desired.

The embodiments described above are designed to provide protection to a pedestrian in a collision between a pedestrian and a vehicle traveling up to 25 miles per hour. The embodiments of the bumper system disclosed herein may be used on any type of vehicle, including conventional automobiles and automobiles having an autonomous mode of operation. Therefore, the term "vehicle" is to be broadly construed to cover any object having a wheel, whether or not motorized, and including a truck, van, semi-trailer truck, motorcycle, golf cart, ATV, off-road vehicle, or farm vehicle, as well as a carrier that rides on a track such as a rollercoaster, trolley, tram, or train car.

Figure 1:
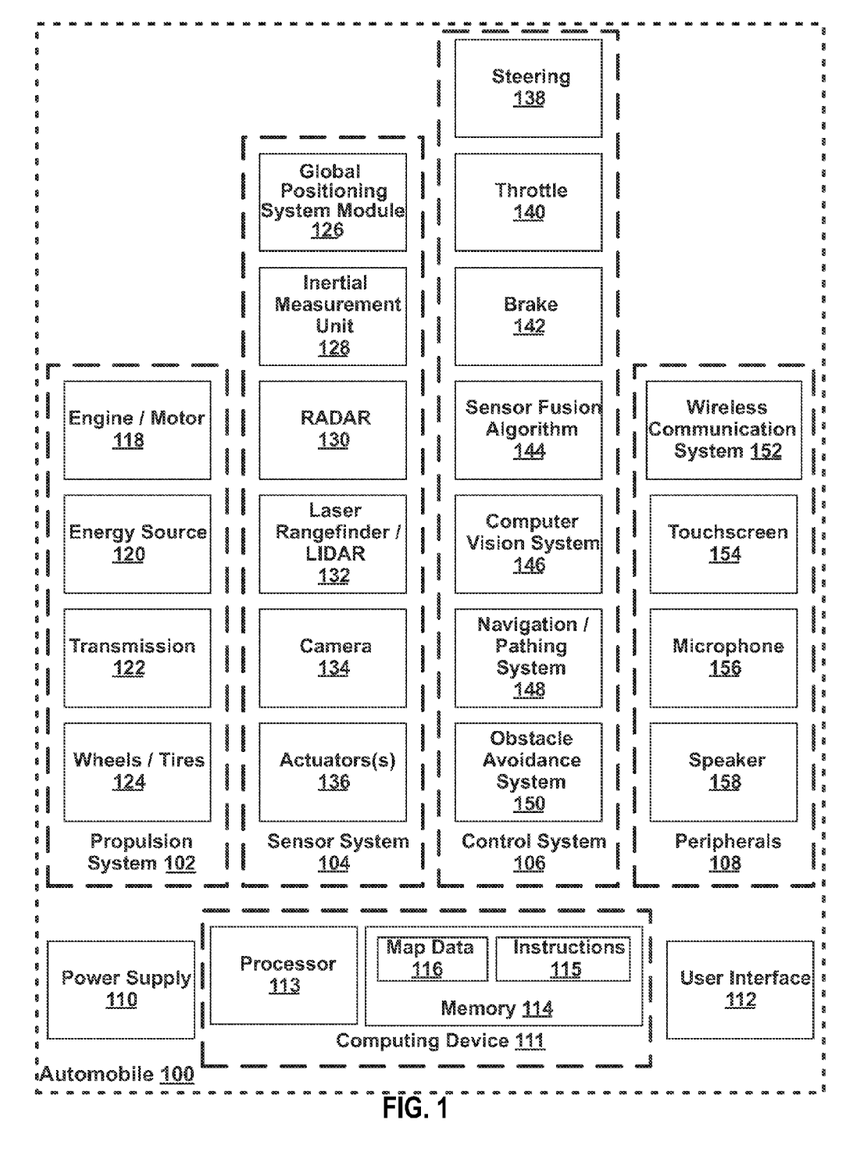
FIG. 1 is a simplified block diagram of an example automobile.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
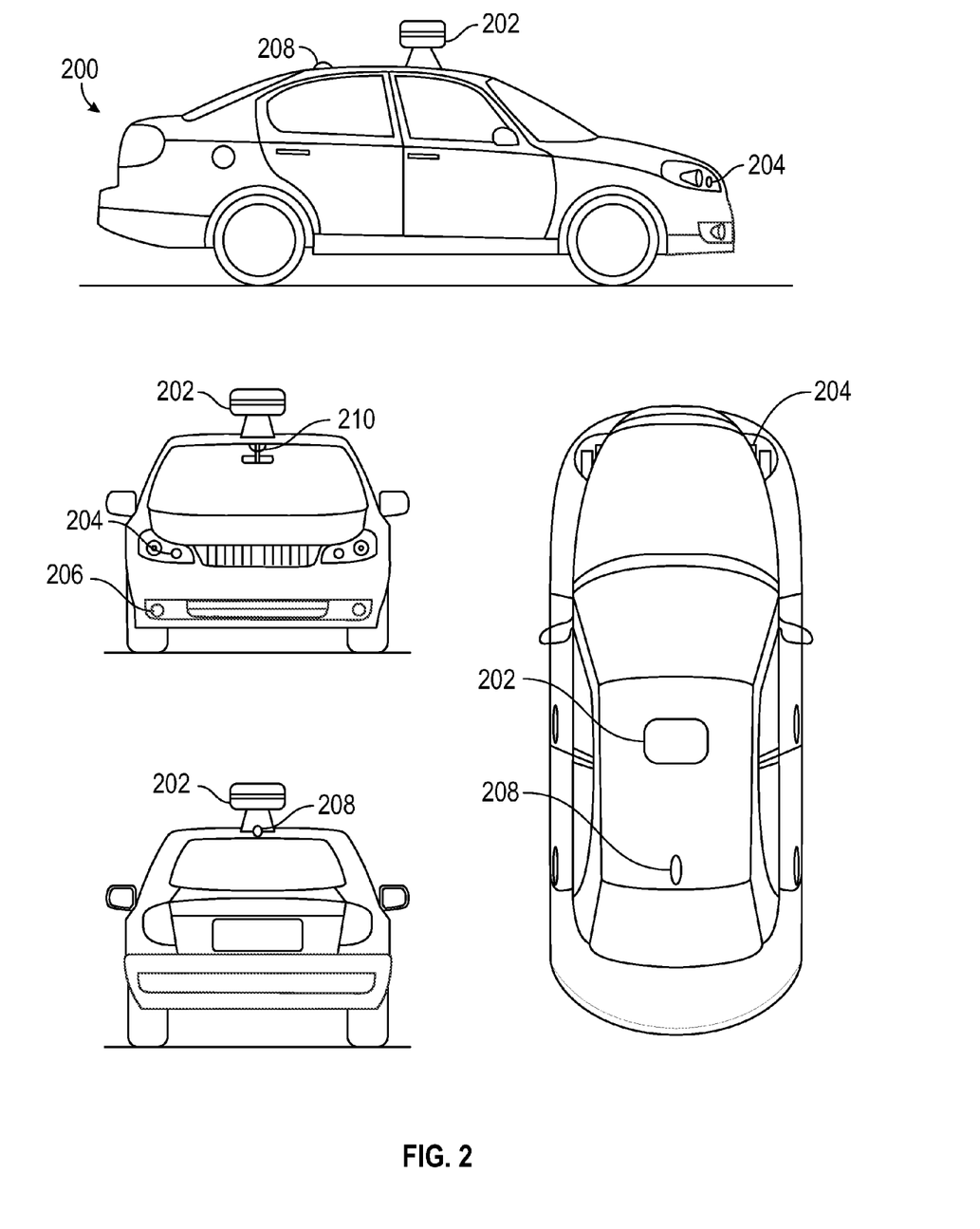
FIG. 2 illustrates an example automobile having an autonomous mode.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

A vehicle, such as automobile 200, may be equipped with a specialized bumper system designed to provide energy absorption and cushioning in the event of a collision with a pedestrian, and that also serves to reduce "spring back" of the bumper on the pedestrian after the initial collision. Example embodiments are provided that include different structures and materials that provide for energy absorption and cushioning in the case of pedestrian impact.

Figure 3:
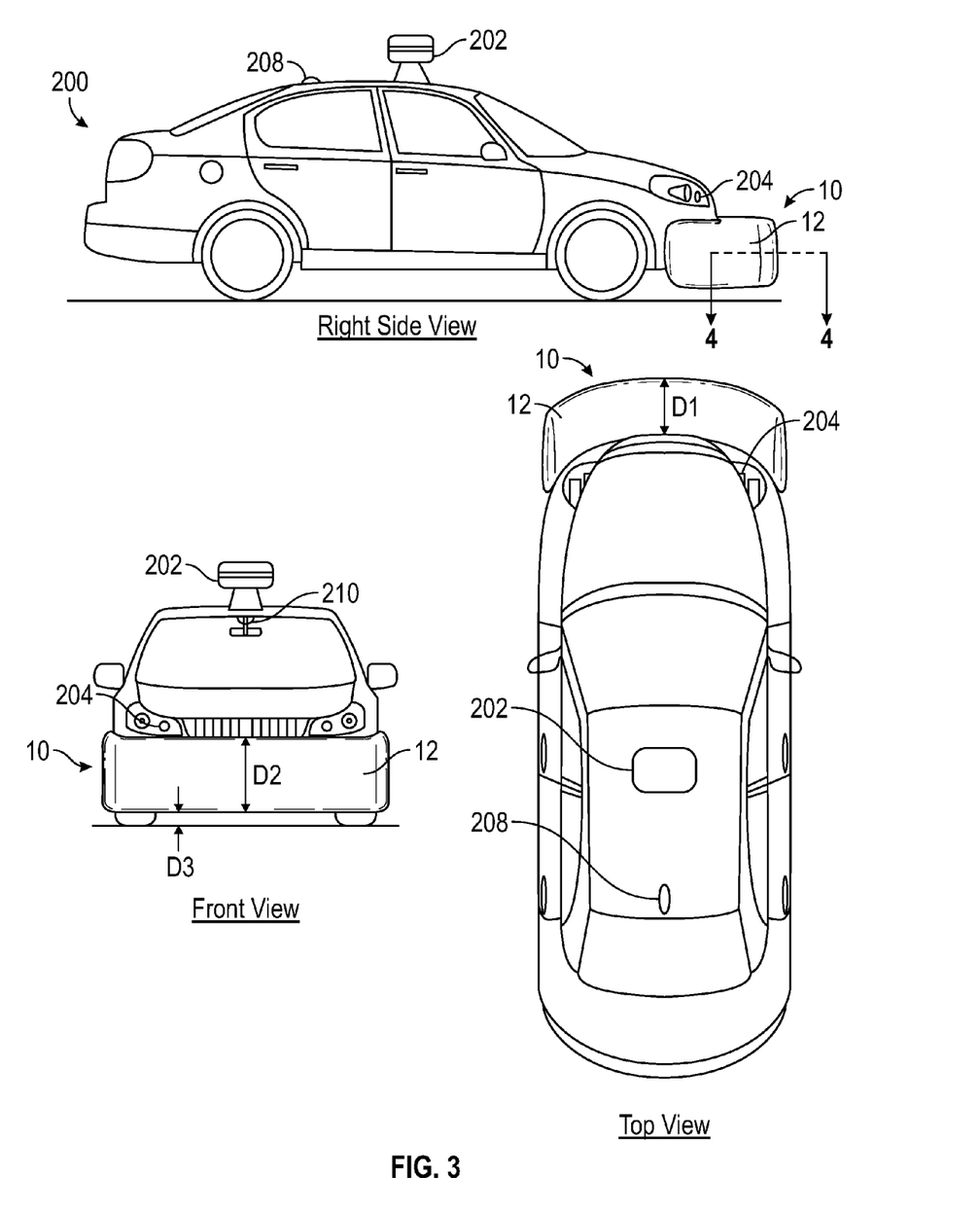
FIG. 3 illustrates a right side view, front view, and top view of the example automobile shown in FIG. 2.

FIG. 3 illustrates a right side view, front view, and top view of the example automobile 200 shown in FIG. 2 equipped with the specialized bumper system 10. In particular, as shown in the right side view and the top view of automobile 200, the bumper system 10 includes a bumper 12 that extends outwardly from the front of automobile 200 a distance D1, a distance much larger than a conventional bumper. The distance D1 is defined as the thickness of the bumper material 12 in front of the vehicle. In a preferred embodiment, the distance D1 may extend 1 or 2 feet, or more, in front of automobile 200. The increased distance D1 provides for a longer deceleration distance resulting in reduced pedestrian injury.

Preferably, the bumper 12 is positioned over a conventional vehicle bumper, although in some embodiments, a conventional bumper is not required. In the case, where bumper 12 is positioned over a conventional bumper, the bumper 12 would therefore extend outwardly 1 to 2 feet from the conventional bumper.

In addition, as shown in the front view of the example automobile 200, the bumper system 10 includes a bumper 12 that has a vertical height D2, which may also be much larger than a conventional bumper. The distance D2 is defined as the vertical height of the bumper 12 from a lower portion of bumper 12 to an upper portion of the bumper 12 at the center of the vehicle. In a preferred embodiment, the distance D2 may be 1 or 2 feet, or more. Furthermore, bumper 12 may be positioned above the ground a distance D3, which may be lower to the ground than a conventional bumper. Ideally bumper 12 extends from the ankle of a pedestrian to a point above the knee of the pedestrian. By having a vehicle bumper of this substantial width and height, the forces on the pedestrian's leg are spread out by the depth of the bumper, as well as the height of the bumper.

In one embodiment, variations of which are shown in FIGS. 4A-6D, the bumper system 10 is comprised of an energy absorption structure 12 composed of multiple air sacs. Air sacs could be small, medium, or large in size, for instance from 1 mm to 100 mm or larger in characteristic diameter or length. Air sacs may be made from a polymer or elastic membrane material and filled with air or other suitable gas and/or liquid. The air cells or sacs could also be tubular with a length on the order of 3 to 4 inches, and several inches or more in diameter.

Figure 4A:
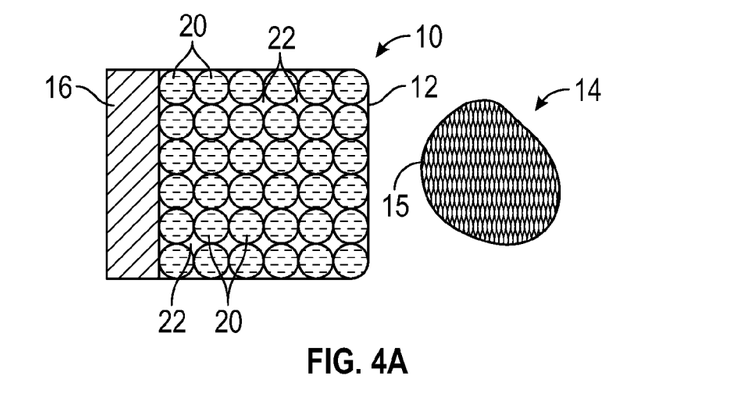
FIG. 4A is a cross-sectional top view of bumper system 10 taken along line 4-4 in FIG. 3 prior to impact with pedestrian leg 14.

FIG. 4A is a cross-sectional top view of bumper system 10 taken along line 4-4 in FIG. 3 prior to impact with pedestrian leg 14. In FIG. 4A, the bumper 12 is an energy absorbing structure that includes a plurality of air sacs 20, shown with gaps 22 between the respective air sacs. The bumper 12 is positioned in front of vehicle support 16. Vehicle support 16 may comprise a conventional vehicle bumper, a crash box, crumple zone, the vehicle chassis, or other portion of the vehicle. In a preferred embodiment the vehicle support 16 is a conventional vehicle bumper. In FIG. 4A, the front portion 15 of pedestrian leg 14 is shown prior to impact with bumper 12.

Figure 4B:
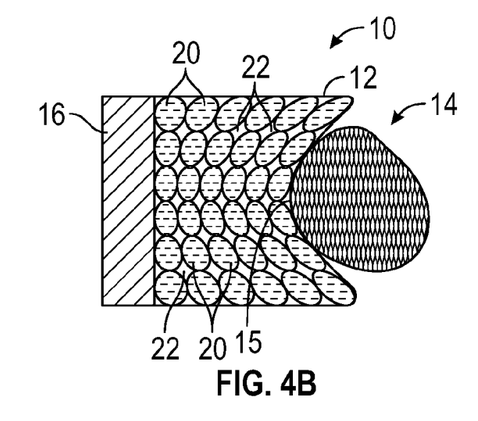
FIG. 4B is a cross-sectional top view of bumper system 10 shown in FIG. 4A, after impact with pedestrian leg 14.

FIG. 4B is a cross-sectional top view of bumper system 10 shown in FIG. 4A, after impact with pedestrian leg 14. At this point of the impact, bumper 12 absorbs energy from the impact with pedestrian leg 14 and provides cushioning for the pedestrian leg 14, with the air sacs 20 being compressed and the gaps 22 between the air sacs 20 being reduced. At this point, the bumper 12 is undergoing elastic deformation.

Figure 4C:
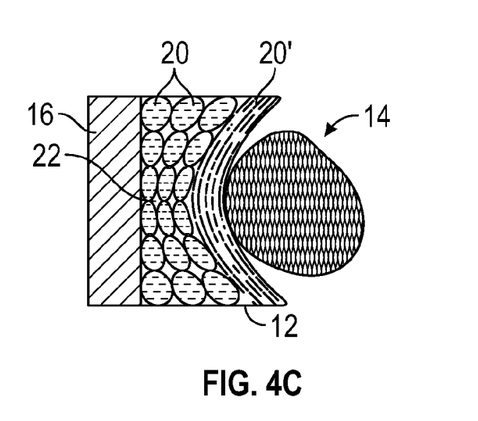
FIG. 4C is a cross-sectional top view of bumper system 10 shown in FIGS. 4A and 4B after further impact with pedestrian leg 14.

FIG. 4C is a cross-sectional top view of bumper system 10 shown in FIGS. 4A and 4B after further impact with pedestrian leg 14. As the pedestrian leg moves further towards vehicle support 16, the membranes of at least some of the air sacs 20 undergo stretching and eventually burst resulting in burst air sacs 20'. As a result of the stretching and bursting of the air sacs the bumper 12 is undergoing plastic deformation.

Figure 4D:
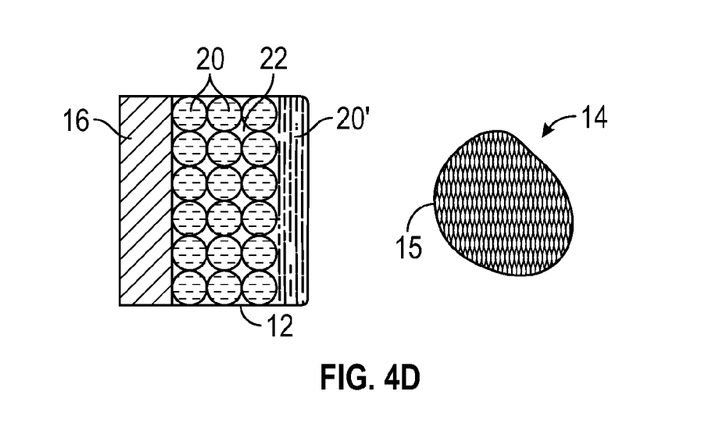
FIG. 4D is a cross-sectional top view of bumper system 10 shown in FIGS. 4A-4C, after the impact with pedestrian leg 14 is over.

FIG. 4D is a cross-sectional top view of bumper system 10 shown in FIGS. 4A-4C, after the impact with pedestrian leg 14 is over, and the bumper 12 is no longer in contact with front portion 15 of pedestrian leg 14. In FIG. 4D, after the force of the pedestrian leg 14 on the bumper 12 is removed, the unburst air sacs 20, and the gaps 22 between the airs sacs 20 return to the pre-impact state shown in FIG. 4A. However, the burst air sacs 20' are destroyed by the impact and do not return to their initial state. As a result of the plastic deformation of bumper 12 caused by the bursting of the air sacs, the bumper 12 greatly reduces or eliminates the "spring back" that could cause a pedestrian to rebound from the vehicle and suffer a secondary injury from secondary contact with the road surface or other object. Thus, the bumper system 10 shown in FIGS. 4A-4D provides cushioning to the pedestrian leg 14 during impact, and also reduces or prevents spring back that could result in a secondary injury to the pedestrian.

Figure 5A:
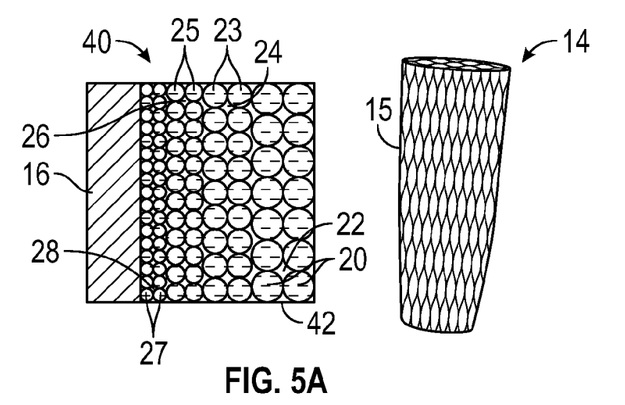
FIG. 5A is a cross-sectional side view of bumper system 40 prior to impact with pedestrian leg 14.

A modified bumper system 40 is shown in FIGS. 5A-5D that is similar to bumper system 10, except that it includes air sacs of varying sizes in bumper 42. In addition, bumper system 40 utilizes air sacs of different sizes where air sacs nearest the point of impact are larger in size than air sacs that are further from the point of impact. FIG. 5A is a cross-sectional side view of bumper system 40 prior to impact with pedestrian leg 14. In FIG. 5A, the bumper 42 is an energy absorbing structure that includes a plurality of air sacs 20 of a first size, shown with gaps 22 between the respective air sacs 20. Bumper 42 also includes a second plurality of air sacs 23 of a second, smaller size, with gaps 24 positioned therebetween, a third plurality of air sacs 25 of a third, even smaller size, with gaps 26 positioned therebetween, and a fourth plurality of air sacs 27 of fourth smallest size, with gaps 28 positioned therebetween. Thus, the sizes of the air sacs are progressively reduced in size from the front of the bumper 42 to the rear of the bumper 42 adjacent vehicle support 16. In FIG. 5A, the front portion 15 of pedestrian leg 14 is shown prior to impact with bumper 42.

Figure 5B:
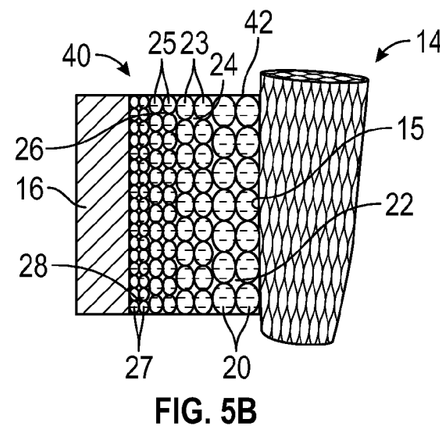
FIG. 5B is a cross-sectional side view of bumper system 40 shown in FIG. 5A, after impact with pedestrian leg 14.

FIG. 5B is a cross-sectional side view of bumper system 40 shown in FIG. 5A, after impact with pedestrian leg 14. At this point of the impact, bumper 42 absorbs energy from the impact with pedestrian leg 14 and provides cushioning for the pedestrian leg 14, with the air sacs 20, 23, 25, and 27 being compressed and the gaps 22, 24, 26, and 28 between the air sacs being reduced in size. At this point, the bumper 42 is undergoing elastic deformation.

Figure 5C:
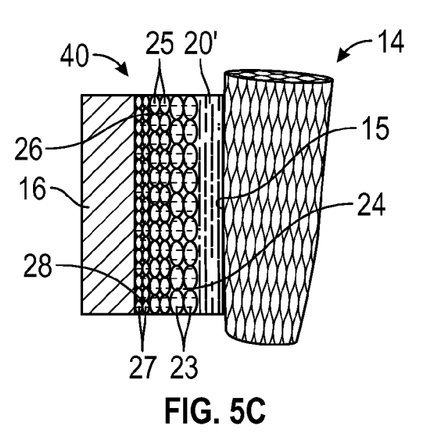
FIG. 5C is a cross-sectional side view of bumper system 40 shown in FIGS. 5A and 5B after further impact with pedestrian leg 14.

FIG. 5C is a cross-sectional side view of bumper system 40 shown in FIGS. 5A and 5B after further impact with pedestrian leg 14. As the pedestrian leg moves further towards vehicle support 16, the membranes of at least some of the air sacs 20, 23, 25, and 27 undergo stretching and eventually burst resulting in the burst air sacs. In FIG. 5C, the burst air sacs 20' are shown at the front of bumper 42, although stretching and/or bursting of air sacs 23, 25, and 27 could result as well even though it is not reflected in FIG. 5C. As a result of the stretching and bursting of the air sacs the bumper 42 is undergoing plastic deformation.

Figure 5D:
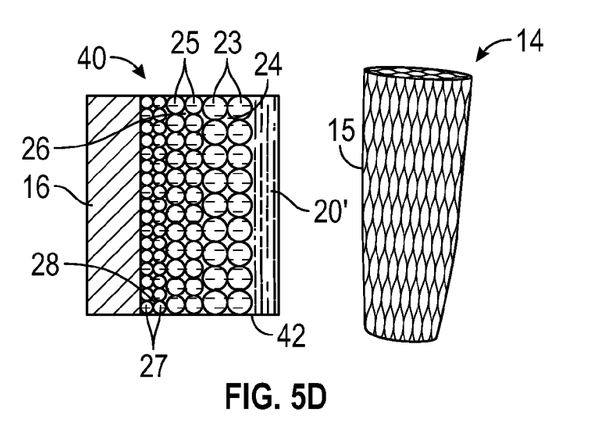
FIG. 5D is a cross-sectional side view of bumper system 40 shown in FIGS. 5A-5C, after the impact with pedestrian leg 14 is over.

FIG. 5D is a cross-sectional side view of bumper system 40 shown in FIGS. 5A-5C, after the impact with pedestrian leg 14 is no longer in contact with front portion 15 of pedestrian leg 14. In FIG. 5D, after the force of the pedestrian leg 14 on the bumper 42 is removed, the unburst air sacs 23, 25, and 27, and the gaps 24, 26, and 28 between them return to the pre-impact state shown in FIG. 5A. However, the burst air sacs 20' are destroyed by the impact and do not return to their initial state. As a result of the plastic deformation of bumper 42 caused by the bursting of the air sacs, the bumper 42 greatly reduces or eliminates the "spring back" that could cause a pedestrian to rebound from the vehicle and suffer a secondary injury from secondary contact with the road surface or other object. Thus, the bumper system 40 shown in FIGS. 5A-5D also provides cushioning to the pedestrian leg 14 during impact, and also reduces or prevents spring back that could result in a secondary injury to the pedestrian.

The use of larger sized air sacs 20 at the front portion of the bumper 42 and smaller sized air sacs 23, 25, and 27 further from the front portion of bumper 42 provide for a bumper 42 that is relatively "softer" near the front and becomes relatively stiffer as the depth of impact with pedestrian leg 14 increases. Alternately, air sacs having thinner or weaker membranes that would burst first could be positioned at the front of the bumper 42 to provide for a bumper 42 that is relatively "soft" near the front of the bumper that would accommodate for lower speed collisions.

It will be appreciated that the size and spacing the air sacs could be varied as desired. Thus, smaller sized air sacs could be positioned nearer the front of the bumper 42 as desired, and smaller sized air sacs could be interspersed with larger sized air sacs to reduce the average gap size between adjacent air sacs. In addition, air sacs having members of varying thickness or strength could also be positioned within the bumper 42 to achieve a desired "softness" at certain locations within the bumper 42.

A similar approach could be taken with respect to the top and bottom of the bumper 42. For example, it may be desirable to have an upper portion of bumper 42, at the point near where impact with the knee of a pedestrian would be expected to occur, to be softer than a lower portion of bumper 42, to provide even greater reduction in "spring back" at the knee portion relative to the ankle portion where it may be desired to have some level of spring back to prevent the ankle from becoming trapped between the vehicle and the roadway.

Figure 6A:
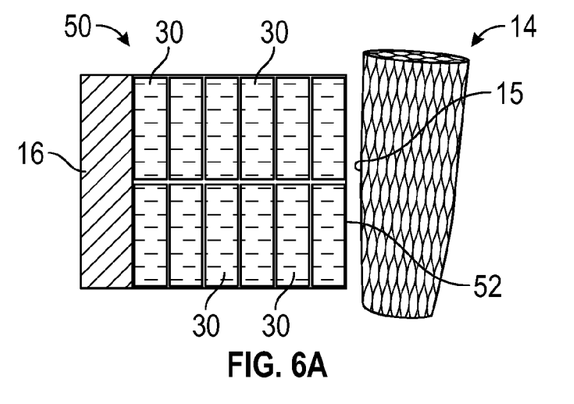
FIG. 6A is a cross-sectional side view of bumper system 50 prior to impact with pedestrian leg 14.

A modified bumper system 50 is shown in FIGS. 6A-6D that is similar to bumper system 10, except that it includes air sacs of that are comprised of generally rectangular-shaped members that are oriented vertically, and adjacent one another in bumper 52. FIG. 6A is a cross-sectional side view of bumper system 50 prior to impact with pedestrian leg 14. In FIG. 6A, the bumper 52 is an energy absorbing structure that includes a plurality of rectangular-shaped air sacs 30 that are aligned vertically adjacent to each other, and shown with a first row of air sacs 30 positioned above a second row of air sacs 30 that are also aligned vertically adjacent to each other. Bumper 52 is shown positioned in front of vehicle support 16. In FIG. 6A, the front portion 15 of pedestrian leg 14 is shown prior to impact with bumper 52.

Figure 6B:
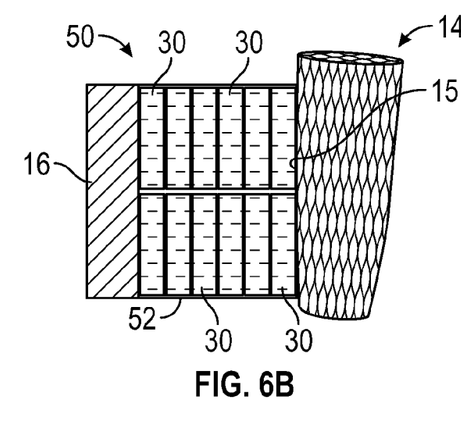
FIG. 6B is a cross-sectional side view of bumper system 50 shown in FIG. 6A, after impact with pedestrian leg 14.

FIG. 6B is a cross-sectional side view of bumper system 50 shown in FIG. 6A, after impact with pedestrian leg 14. At this point of the impact, bumper 52 absorbs energy from the impact with pedestrian leg 14 and provides cushioning for the pedestrian leg 14, with the air sacs 30 being compressed and reduced in size. At this point, the bumper 52 is undergoing elastic deformation.

Figure 6C:
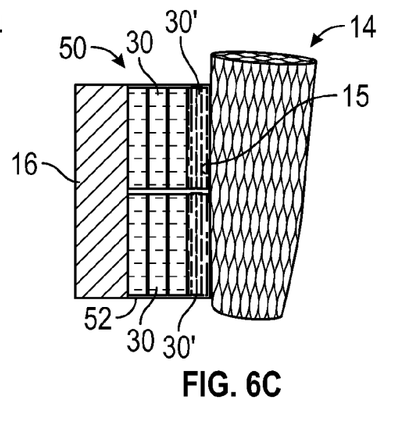
FIG. 6C is a cross-sectional side view of bumper system 50 shown in FIGS. 6A and 6B after further impact with pedestrian leg 14.

FIG. 6C is a cross-sectional side view of bumper system 50 shown in FIGS. 6A and 6B after further impact with pedestrian leg 14. As the pedestrian leg moves further towards vehicle support 16, the membranes of at least some of the air sacs 30 undergo stretching and eventually burst resulting in burst air sacs 30'. In FIG. 6C, the burst air sacs 30' are shown at the front of bumper 52, although stretching and/or bursting of air sacs 30 at other positions within the bumper 52 could result as well even though it is not reflected in FIG. 6C. As a result of the stretching and bursting of the air sacs the bumper 52 is undergoing plastic deformation.

Figure 6D:
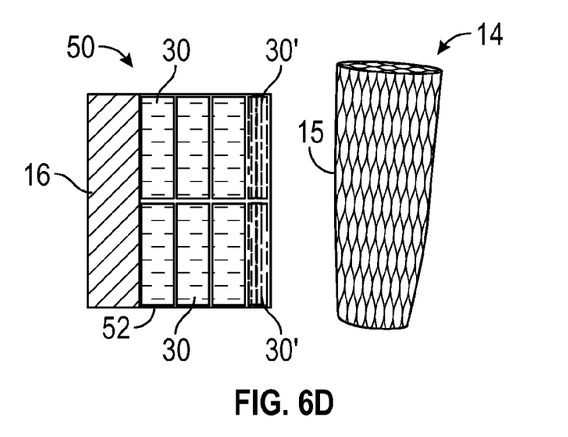
FIG. 6D is a cross-sectional side view of bumper system 50 shown in FIGS. 6A-6C, after the impact with pedestrian leg 14 is over.

FIG. 6D is a cross-sectional side view of bumper system 50 shown in FIGS. 6A-6C, after the impact with pedestrian leg 14 is over, and the bumper 52 is no longer in contact with front portion 15 of pedestrian leg 14. In FIG. 6D, after the force of the pedestrian leg 14 on the bumper 52 is removed, the unburst air sacs 30 may return to the pre-impact state shown in FIG. 6A. However, the burst air sacs 30' are destroyed by the impact and do not return to their initial state. As a result of the plastic deformation of bumper 12 caused by the bursting of the air sacs, the bumper 52 greatly reduces or eliminates the "spring back" that could cause a pedestrian to rebound from the vehicle and suffer a secondary injury from secondary contact with the road surface or other object. Thus, the bumper system 50 shown in FIGS. 6A-6D also provides cushioning to the pedestrian leg 14 during impact, and also reduces or prevents spring back that could result in a secondary injury to the pedestrian.

Air sacs 30 shown in FIGS. 6A-6D could also have a geometry other than a rectangular shaped member. For example, air sac 30 could be generally square-shaped, triangle-shaped, or hexagonally-shaped as well. Preferably, the geometry is such that rows of adjacent air sacs may closely align with each other to reduce the size of the gaps between adjacent air sacs. An advantage of using air sacs having opposed sides shaped as rectangles, triangles, squares, or hexagons is that they may be formed as a continuous roll with a heat seal and perhaps a perforation separating the air pillows on the roll. The rectangular and square shaped design are most preferred as they allow for ease of manufacture because the air sac may be filled with air and then sealed at either end with a parallel seal. Adjacent air sacs may share a sealed end which could be perforated for easily separating respective air sacs, if desired.

The respective air sacs or cells may be bonded to one another using adhesive, or heat sealed together. Alternately, the air sacs or cells may be held in place within a bag or net. In a pedestrian impact, energy is absorbed by the (a) stretching and then (b) popping of each air sac. Furthermore, as a result of the popping of the air sacs, the bumper may be largely destroyed in a pedestrian collision. Thus, there is minimal spring back after air is released from the fractured sacs. As a result, this design eliminates or reduces spring back that may cause the pedestrian to suffer a secondary impact with the roadway or other object.

A solid structure may be created by compressing the sacs in a mold when they are bonded to one another, similar to a Styrofoam cup or cooler. Or, a porous structure may be constructed from the sacs with gaps between adjacent sacs that touch at only isolated points. This arrangement provides for a lower effective modulus and strength for the bulk structure.

In another embodiment, variations of which are shown in FIGS. 7A-8C, the bumper is comprised of a visco-elastic material that is used to absorb impact energy. A low cross-linked silicone or acrylic is a good choice for this material. More or less cross-linking may be used as desired. However, the more cross-linking that is used, the more "spring back" the bumper material will have. When using a vehicle bumper comprised of a visco-elastic material, in a pedestrian impact the viscous material is forced to move out of the way of the pedestrian's legs and lower body. Relative speed between the vehicle and the pedestrian would be gradually slowed as the viscous losses in the material convert kinetic energy to heat.

The damping ratio and density are chosen to provide for gradual deceleration over a large distance, to prevent injury to the pedestrian during the initial impact with the vehicle bumper. Because the material is highly viscous, spring back is minimal and very well damped. This helps prevent the pedestrian from rebounding off the vehicle and incurring a dangerous secondary impact with the road surface or other object.

It will be appreciated that a bumper made of visco-elastic material such as low cross-linked silicone or acrylic will be relatively heavy, and may also not be as "soft" as desired. Of course, unnecessary additional weight on a vehicle is undesirable. Therefore, it may be desirable to reduce the amount of material within the bumper.

To this end, a lattice structure or other relief features could be included in the visco-elastic material to reduce the amount of material, and thus the weight of the bumper; as well as the effective stiffness of the bumper. This allows the effective bulk modulus of the material to be reduced compared to a solid volume of the same material, providing a "softer" bumper.

Figure 7A:
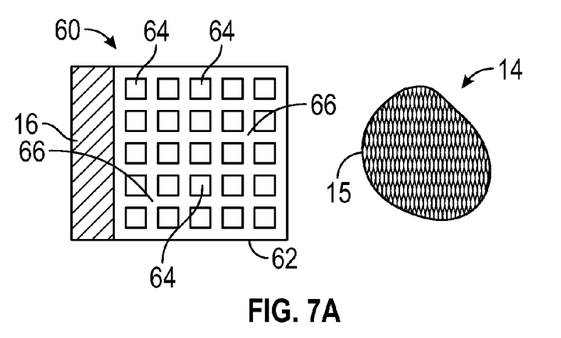
FIG. 7A is a cross-sectional top view of bumper system 60 prior to impact with pedestrian leg 14.

An embodiment of bumper system 60 is shown in FIGS. 7A-7D showing a bumper 62 that comprises a visco-elastic material. FIG. 7A is a cross-sectional top view of bumper 60 prior to impact with pedestrian leg 14. In FIG. 7A, the bumper 62 is an energy absorbing structure comprised of a visco-elastic material 66. A plurality of gaps 64 are positioned within the visco-elastic material 66 that reduce the overall weight of the bumper 62 and also reduce the overall bulk modulus of the visco-elastic material 66. The bumper 62 is positioned in front of vehicle support 16. Vehicle support 16 may comprise a conventional vehicle bumper, a crash box, crumple zone, the vehicle chassis, or other portion of the vehicle. In a preferred embodiment the vehicle support 16 is a conventional vehicle bumper. In FIG. 7A, the front portion 15 of pedestrian leg 14 is shown prior to impact with bumper 62.

Figure 7B:
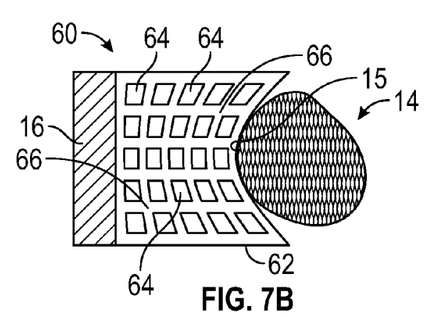
FIG. 7B is a cross-sectional top view of bumper system 60 shown in FIG. 7A, after impact with pedestrian leg 14.

FIG. 7B is a cross-sectional top view of bumper system 60 shown in FIG. 7A, after impact with pedestrian leg 14. At this point of the impact, bumper 62 absorbs energy from the impact with pedestrian leg 14 and provides cushioning for the pedestrian leg 14, with the visco-elastic material 66 and the gaps 64 being compressed. At this point, the bumper 62 is undergoing elastic deformation and is generally free of destructive plastic deformation.

Figure 7C:
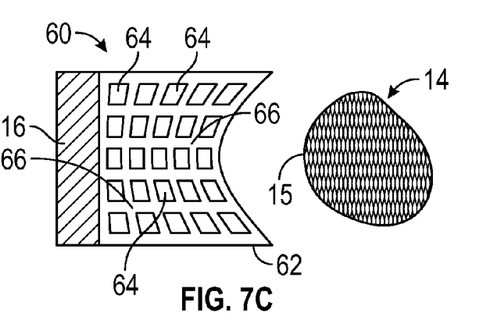
FIG. 7C is a cross-sectional top view of bumper system 60 shown in FIGS. 7A and 7B just after impact with pedestrian leg 14 is over.

FIG. 7C is a cross-sectional top view of bumper system 60 shown in FIGS. 7A and 7B just after the impact with the pedestrian leg 14 is over, and the bumper system 60 is no longer in contact with front portion 15 of pedestrian leg 14. In FIG. 7C, just after impact, the visco-elastic member 66 is still in a compressed state due to the properties of the visco-elastic material. As a result of the visco-elastomeric material initially remaining in a compressed state after the impact is over, the bumper 62 greatly reduces or eliminates the "spring back" that could cause a pedestrian to rebound from the vehicle and suffer a secondary injury from secondary contact with the road surface or other object. Thus, the bumper system 60 shown in FIGS. 7A-7C provides cushioning to the pedestrian leg 14 during impact, and also reduces or prevents spring back that could result in a secondary injury to the pedestrian.

Figure 7D:
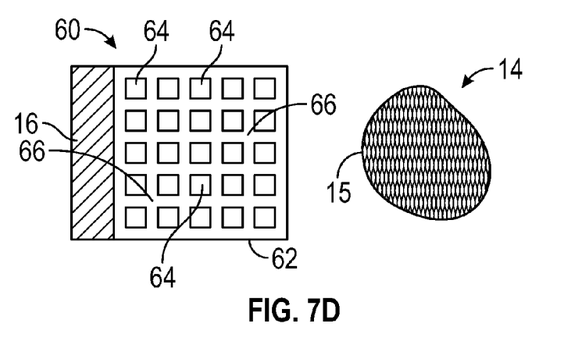
FIG. 7D is a cross-sectional top view of bumper system 60 shown in FIGS. 7A-7C a minute after the impact with pedestrian leg 14 is over.

FIG. 7D is a cross-sectional top view of bumper system 60 shown in FIGS. 7A-7C a minute after further impact with pedestrian leg 14 is over. After the impact is over, the visco-elastic material 66 regains its original shape in a matter of seconds, or tens of seconds. In FIG. 7D, the bumper 62 is shown a minute after the impact is over and shows that bumper 62 and visco-elastic material 66 and gaps 64 have returned to their original shape. Thus, unlike bumper systems 10, 40, and 50 in FIGS. 4A-6D, the bumper system 60 is not destroyed during the impact, eliminating the need to repair or replace bumper 62 after a pedestrian collision.

Figure 8A:
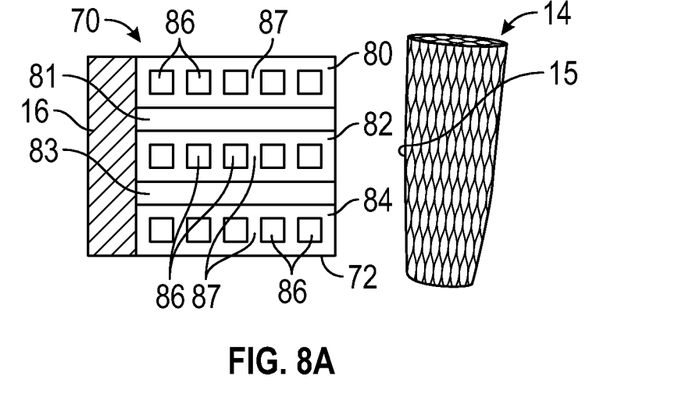
FIG. 8A is a cross-sectional side view of bumper system 70 prior to impact with pedestrian leg 14.

Another bumper system 70 is shown in FIGS. 8A-8E that is similar to bumper system 60, except that it includes solid sheets of visco-elastic material between sheets of visco-elastic material having gaps. FIG. 8A is a cross-sectional side view of bumper 72 prior to impact with pedestrian leg 14. In FIG. 8A, the bumper 72 is an energy absorbing structure comprised of a plurality of sheets of visco-elastic material. In particular, bumper 72 includes sheet 81 comprised of visco-elastic material positioned beneath sheet 81 that is comprised of visco-elastic material 87 and with gaps 86 positioned within the visco-elastic material 87. Sheet 82 is positioned beneath sheet 81 and is comprised of visco-elastic material 87 and with gaps 86 positioned within the visco-elastic material 87. Sheet 83 is comprised of visco-elastic material positioned beneath sheet 82 that is comprised of visco-elastic material 87 and with gaps 86 positioned within the visco-elastic material 87. Sheet 84 is positioned beneath sheet 83 and is comprised of visco-elastic material 87 and with gaps 86 positioned within the visco-elastic material 87.

Gaps 86 in sheets 80, 82, and 84 serve to reduce the weight of bumper 72 and to reduce the overall bulk modulus of the visco-elastic material 87. Additional sheets of visco-elastic material with or without gaps could also be used in addition to, or in place of, sheets 80-84. In FIG. 8A, the front portion 15 of pedestrian leg 14 is shown prior to impact with bumper 12.

Figure 8B:
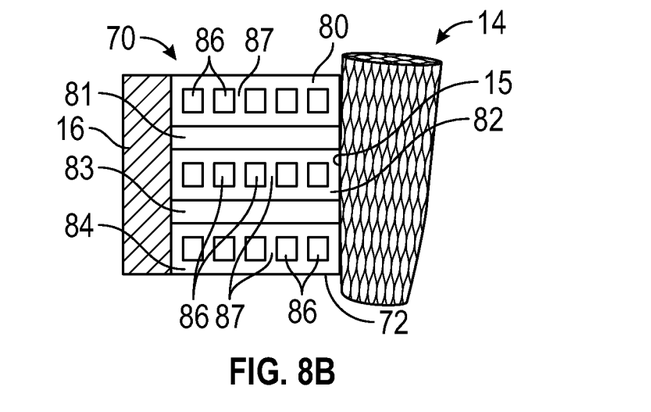
FIG. 8B is a cross-sectional side view of bumper system 70 shown in FIG. 8A, after impact with pedestrian leg 14.

FIG. 8B is a cross-sectional side view of bumper system 70 shown in FIG. 8A, after impact with pedestrian leg 14. At this point of the impact, bumper 72 absorbs energy from the impact with pedestrian leg 14 and provides cushioning for the pedestrian leg 14, with the visco-elastic material 87 and the gaps 86 and sheets 80-84 being compressed. At this point, the bumper 72 is undergoing elastic deformation and is generally free of destructive plastic deformation.

Figure 8C:
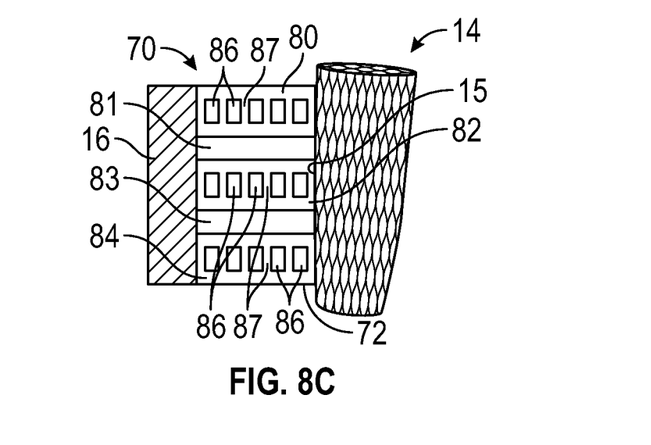
FIG. 8C is a cross-sectional side view of bumper system 70 shown in FIGS. 8A and 8B after further impact with pedestrian leg 14.

FIG. 8C is a cross-sectional side view of bumper 70 shown in FIGS. 8A and 8B after further impact with pedestrian leg 14. As the pedestrian leg moves further towards vehicle support 16, the visco-elastic material 87 and gaps 86 and sheets 80-84 are further compressed. However, unlike the bumper systems 10, 40, and 50 shown in FIGS. 4A-6D, the bumper 72 is still undergoing elastic deformation and is still generally free of destructive plastic deformation.

Figure 8D:
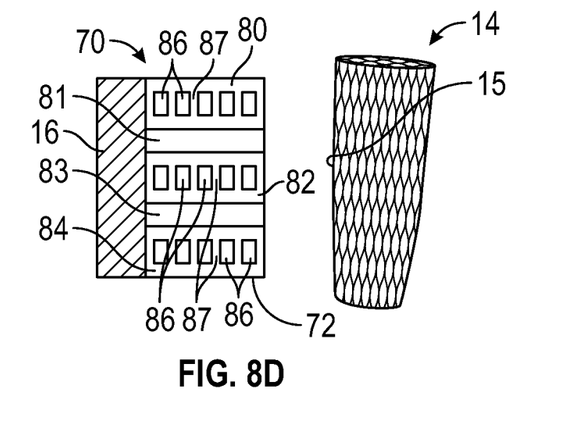
FIG. 8D is a cross-sectional side view of bumper system 70 shown in FIGS. 8A-8C, just after the impact with pedestrian leg 14 is over.

FIG. 8D is a cross-sectional side view of bumper 70 shown in FIGS. 8A-8C just after the impact with pedestrian leg 14 is over, and the bumper system 70 is no longer in contact with front portion 15 of pedestrian leg 14. In FIG. 8D, just after impact, the visco-elastic member 87 and sheets 80-84 are still in a compressed state due to the properties of the visco-elastic material. As a result of the visco-elastomeric material initially remaining in a compressed state after the impact is over, the bumper 72 greatly reduces or eliminates the "spring back" that could cause a pedestrian to rebound from the vehicle and suffer a secondary injury from secondary contact with the road surface or other object. Thus, the bumper system 70 shown in FIGS. 8A-8D provides cushioning to the pedestrian leg 14 during impact, and also reduces or prevents spring back that could result in a secondary injury to the pedestrian.

Figure 8E:
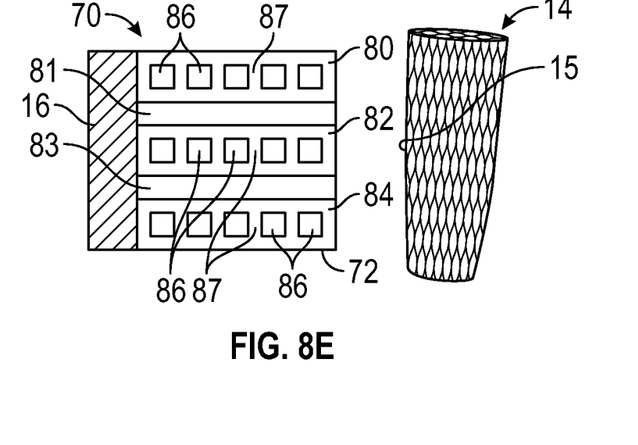
FIG. 8E is a cross-sectional side view of bumper system 70 shown in FIGS. 8A-8D a minute after the impact with pedestrian leg 14 is over.

FIG. 8E is a cross-sectional side view of bumper system 70 shown in FIGS. 8A-8D, a minute after the impact with pedestrian leg 14 is over. After the impact is over, the visco-elastic material 87 and sheets 80-84 regain their original shape in a matter of seconds, or tens of seconds. In FIG. 8E, the bumper 72 is shown a minute after the impact is over and shows that bumper 72 and visco-elastic material 87 and gaps 64, and sheets 80-84 have returned to their original shape. Thus, similar to bumper system 60, and unlike bumper systems 10, 40, and 50 in FIGS. 4A-6D, the bumper system 70 is not destroyed during the impact, eliminating the need to repair or replace bumper 72 after a pedestrian collision.

The bumper 72 shown in FIGS. 8A-8E could be formed by combining sheets of silicone (or acrylic) layers together. Each sheet could have material removed from the sheet via a die cut operation. For example, one inch diameter (or larger) holes or squares could be cut from the sheet to remove material. Alternately, it is also possible that the silicone sheets could be molded with holes or gaps to provide for less material.

In any event, the silicone (or acrylic) sheets could be stacked together and adhered with a silicone adhesive or pressure sensitive adhesive. Some sheets could have relief cuts or holes, and others without relief cuts or holes, as desired. In this manner, sheets having varying densities and/or gap patterns could be used to construct a desired bumper.

Using either the air sac embodiment shown in FIGS. 4A-6D, or the visco-elastic embodiment shown in FIGS. 7A-8E, it is possible to provide a bumper that has a relatively soft outermost bumper section for very low speed collisions, where the material becomes progressively less soft as it extends towards the vehicle, to provide greater cushioning and energy absorption as the speed of the collision and depth of impact increases.

In addition, the two embodiments could also be advantageously combined. For example, the outermost portion of the bumper could be comprised of air sacs, and an inner bumper section comprised of visco-elastic material (or vice versa), as desired. Alternately, layers of visco-elastic material could be interspersed between layers of air sacs, in either a horizontal or vertical direction, as desired. The embodiments described above are designed to provide protection to a pedestrian in a collision between a pedestrian and a vehicle traveling up to 25 miles per hour.

It will be appreciated that bumper systems described above could be used with a wide variety of different vehicles. However, it may be particularly advantageous to provide a vehicle having an autonomous mode of operation with the above-described bumper systems.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system for protecting a pedestrian during impact with a vehicle, comprising:
   a bumper adapted for attachment to an end of the vehicle;
   wherein the bumper is comprised of a visco-elastic material;
      wherein the bumper has a horizontal thickness that extends from the end of the vehicle;
      wherein the visco-elastic material undergoes deformation and causes deceleration along the horizontal width of the bumper during impact between the pedestrian and the bumper;
      wherein the visco-elastic material does not immediately return to an original shape after impact thereby reducing spring back of the bumper on the pedestrian, and wherein the bumper is comprised of gaps within the visco-elastic material that reduce an overall bulk modulus of the bumper.

2. The system of claim 1, wherein the horizontal thickness of the bumper is 12 inches or more.

3. The system of claim 1, wherein the bumper is comprised of sheets of visco-elastic material stacked together.

4. The system of claim 1, the bumper is comprised of sheets comprised of low cross-linked silicone or acrylic.

5. The system of claim 3, wherein one or more of the sheets of silicone contain gaps that are created by die cutting and removing portions of the silicone sheet.

6. The system of claim 3, wherein one or more of the sheets of silicone are molded with the gaps created during the molding process.

7. The system of claim 1, wherein the bumper has a height that extends a distance from an ankle of a pedestrian to above a knee of the pedestrian when the bumper is positioned on the vehicle.

8. The system of claim 1, wherein an outer section of the bumper has a stiffness that is less than a stiffness of an inner section of the bumper.

9. The system of claim 1, wherein the horizontal thickness of the bumper is 18-24 inches.

10. The system of claim 1, wherein the vehicle has an autonomous mode of operation.

11. A system for protecting a pedestrian during impact with a vehicle, comprising:
a bumper adapted for attachment to an end of the vehicle;
wherein the bumper is comprised of a visco-elastic material;
wherein the bumper has a horizontal thickness that extends from the end of the vehicle;
wherein the visco-elastic material undergoes deformation and causes deceleration along the horizontal width of the bumper during impact between the pedestrian and the bumper;
wherein the visco-elastic material does not immediately return to an original shape after impact thereby reducing spring back of the bumper on the pedestrian; and
wherein the bumper further comprises a section comprised of a plurality of air sacs that stretch and then burst during impact, thereby reducing spring back of the bumper on the pedestrian.

12. A system for protecting a pedestrian during impact with a vehicle, comprising:
a bumper adapted for attachment to an end of the vehicle;
wherein the bumper is comprised of a plurality of air sacs;
wherein the bumper has a horizontal thickness extending from the end of the vehicle;
wherein at least some of the plurality of air sacs stretch and then burst during impact between the bumper and a pedestrian causing deceleration along the horizontal thickness of the bumper during the impact;
wherein the bumper undergoes plastic deformation during impact with the pedestrian and at least some of the air sacs burst during impact; and
wherein the bursting of some of the plurality of air sacs reduces spring back of the bumper on the pedestrian.

13. The system of claim 12, wherein the horizontal thickness of the bumper is 12 inches or more.

14. The system of claim 12, wherein the plurality of air sacs are comprised of polymer tubes.

15. The system of claim 14, wherein the polymer tubes are positioned in a vertical orientation.

16. The system of claim 12, wherein the plurality of air sacs comprise a solid structure created by compressing the sacs in a mold where they are bonded to one another.

17. The system of claim 12, wherein the plurality of air sacs comprise a porous structure with gaps between adjacent air sacs, so that the adjacent air sacs touch each other only at isolated points.

18. The system of claim 12, wherein an average volume of the air sacs in a first portion of the bumper is greater than an average volume of the air sacs in a second portion of the bumper.

19. The system of claim 12, wherein the vehicle has an autonomous mode of operation.

20. The system of claim 12, wherein the bumper has a height that extends a distance from an ankle of a pedestrian to above a knee of the pedestrian when the bumper is positioned on the vehicle.

21. The system of claim 12, wherein the an average strength of a membrane of the air sacs in a first portion of the bumper is greater than an strength of the air sacs in a second portion of the bumper.

22. The system of claim 12, wherein the bumper further includes a section comprised of visco-elastic material.

23. The system of claim 14, wherein the polymer tubes have a generally rectangular or generally square side.

24. The system of claim 18, wherein the first portion of the bumper extends from the second portion of the bumper.

25. The system of claim 18, wherein an average volume of the air sacs in the second portion of the bumper is greater than an average volume of the air sacs in a third portion of the bumper.

26. The system of claim 25, wherein the first portion of the bumper extends from the second portion of the bumper, and the second portion of the bumper extends from the third portion of the bumper.

27. A system for protecting a pedestrian during impact with a vehicle, comprising:
a bumper adapted for attachment to an end of the vehicle;
wherein the bumper is comprised of a visco-elastic material;
wherein the bumper has a horizontal thickness that extends from the end of the vehicle;
wherein the visco-elastic material undergoes deformation and causes deceleration along the horizontal width of the bumper during impact between the pedestrian and the bumper;
wherein the visco-elastic material does not immediately return to an original shape after impact thereby reducing spring back of the bumper on the pedestrian; and
wherein an outer section of the bumper has a stiffness that is less than a stiffness of an inner section of the bumper.

* * * * *